June 8, 1937. W. E. JONES ET AL 2,083,069
KNIFE GRINDER
Filed Jan. 2, 1936 2 Sheets-Sheet 2
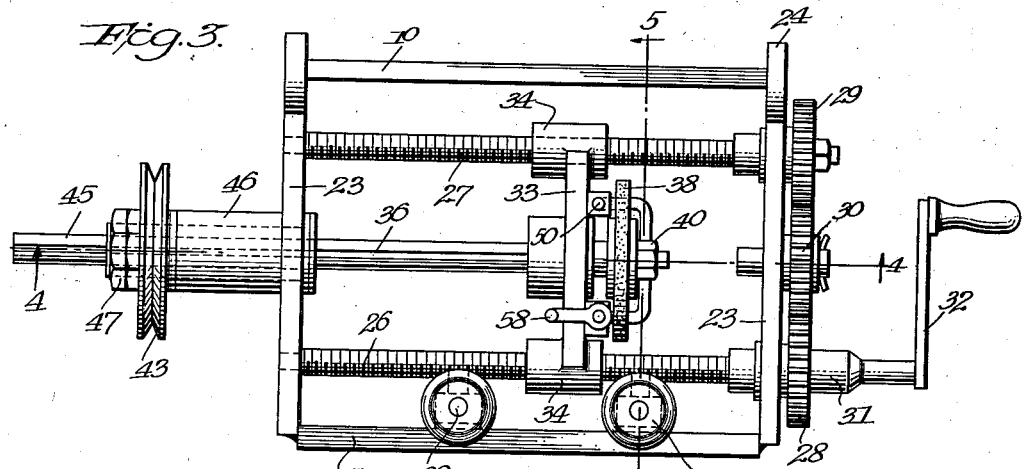
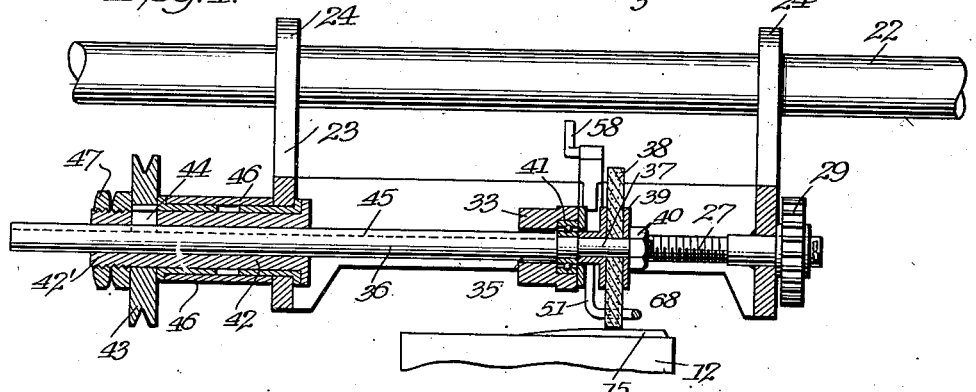
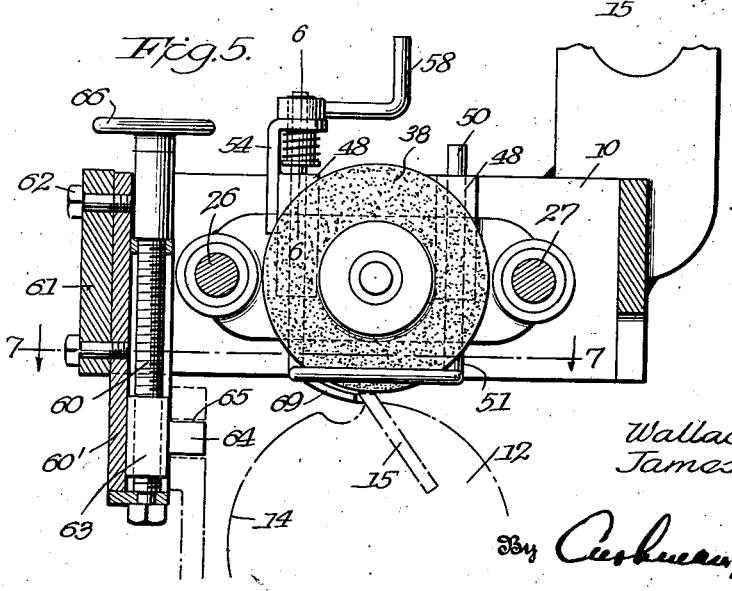
Inventors
Wallace E. Jones,
James D. Taylor.

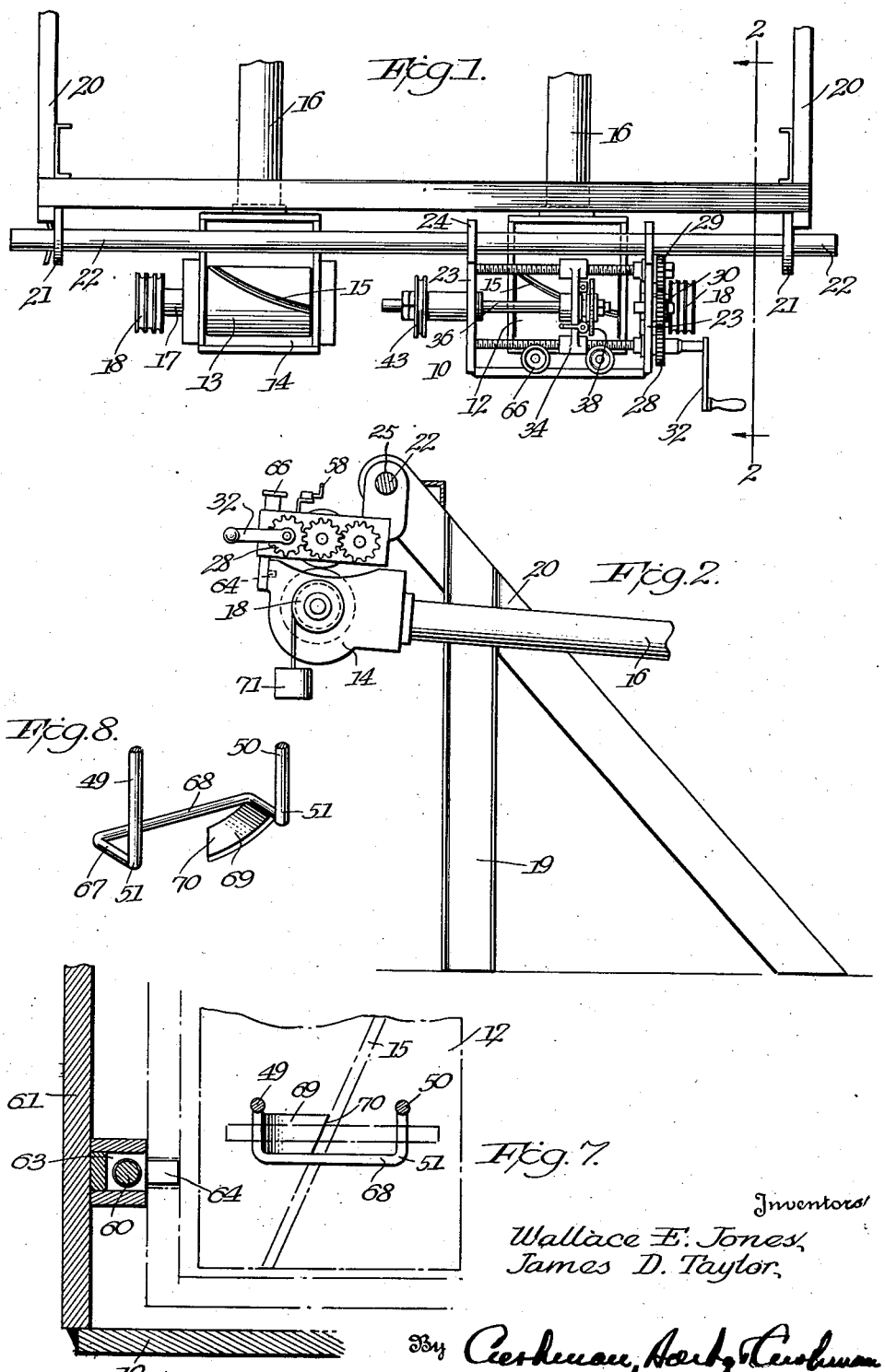

Patented June 8, 1937

2,083,069

UNITED STATES PATENT OFFICE 2,083,069

KNIFE GRINDER

Wallace E. Jones and James D. Taylor, Spartanburg, S. C., assignors to Taylor-Colquitt Co., Spartanburg, S. C., a corporation of South Carolina Application January 2, 1936, Serial No. 57,303

10 Claims. (Cl. 51—249)

The present invention relates to a grinder for sharpening knives and more particularly to an improved portable grinding or abrading attachment for planing, trimming, peeling and other similar types of machines.

A salient feature of the invention is to provide a simple, efficient and compact grinder which may be detachably connected to a cutter head or the like, so that the knives of the cutter head will be uniformly sharpened without requiring the removal of the knives from the head or the disconnecting of the cutter head from its machine.

A further object of the invention consists in associating with the grinder, improved means for maintaining the edge of the knife or blade in proper sharpening position relative to the grinder so that the portion of the knife being sharpened will be disposed substantially tangential to the edge of the grinding wheel and thus effect an even and uniform sharpening of the knives.

A further object comprehends the provision of adjustable means for detachably connecting the cutter head or work to a grinder so that these parts are held firmly in a fixed position, said means also insuring the accurate adjustment of the knives relative to the grinder so as to produce a uniform sharpening and perfect jointing of the knives.

Other objects and advantages of the invention will become apparent from the following description when taken in conjunction with the accompanying claims and drawings.

Referring to the drawings in which is shown a preferred embodiment of the invention:

Figure 1 is a plan view of the grinder associated with a cutter head.

Figure 2 is a sectional view taken substantially along the line 2—2 of Figure 1.

Figure 3 is an enlarged plan view of the grinder.

Figure 4 is a sectional view taken substantially along the line 4—4 of Figure 3.

Figure 5 is a sectional view taken substantially along the line 5—5 of Figure 3.

Figure 6 is a detailed sectional view taken substantially along the line 6—6 of Figure 5.

Figure 7 is a sectional view taken substantially along the line 7—7 of Figure 5; and Figure 8 is a detail perspective view of the lower portion of the follower.

The grinder which is generally indicated as 10 (Figure 1) is capable of use with various types of planing, trimming and other wood working machines, and for the purpose of illustration, is shown associated with a machine for peeling and trimming pine poles. Such machines usually employ a pair of spaced cutter heads 12 and 13, each of which is carried in a housing 14 having an open bottom so as to expose the knives 15 to the work during the peeling operation. The cutter heads are carried by the spaced shafts 16 which are suitably connected to the machine. Each of the cutter heads 12 and 13 may be independently rotated through a drive shaft 17 which extends outwardly from one side of the hood or casing 14 and has keyed thereto a drive pulley 18 which in turn is connected by a belt to a motor or the like, not shown. The shaft 17 and pulley 18 on the cutter head 14 extend from the left of Figure 1 and the cutter head 12 is provided with similar parts, which extend outwardly to the right of this figure.

The grinder 10 is preferably carried by a portable support which has vertically disposed spaced side arms 19 to which are connected the inclined arms 20 (Figure 2). The upper free ends of the arms 20 are provided with bearing brackets 21 through which extends the bar 22.

The grinder 10 may be formed of a frame structure having its spaced opposed sides 23 provided at their inner or rear ends with outwardly projecting arms 24 which have aligned openings 25 through which loosely extends the bar 22. The sides 23 constitute bearings for the longitudinally disposed spaced threaded shafts or rods 26 and 27 (Fig. 3) which extend beyond one of the sides 23 and have keyed thereon the gears 28 and 29 operatively connected to each other through the idle gear 30. As shown, the shaft 26 has an extended portion 31 to which is connected the manually operated handle 32. Manifestly, the handle 32 may be attached to the shaft 27 if desired. It will be seen that upon the rotation of the shaft 26, the gears 28, 30 and 29 will cause the simultaneous rotation of the shaft 27. A carriage 33 is provided at its ends with the threaded sleeves 34 through which extend the shafts 26 and 27 so as to effect longitudinal reciprocating movement of the carriage relative to the frame when the shafts 26 and 27 are rotated by the handle 32. Additionally the carriage 33 has a central opening 35 through which loosely extends a reciprocating drive shaft 36 that has a reduced end portion 37 on which is non-rotatably secured an abrading, grinding or sharpening element such as an emery wheel or disc 38. The wheel 38 may be clamped between the collars 39 and is detachably connected to the end 37 of the shaft by the nut 40. Roller bearings 41 may be interposed between the wall of the opening 35 and the shaft 36 to facilitate the rotation of the shaft.

The shaft 36 extends through a rotatable bushing 42 which is mounted in one of the sides 23 (Figure 4) and extends outwardly therefrom so as to constitute a support for the adjacent end portion of the shaft 36. A pulley 43 carried by the bushing 42 has a key 44 which extends through the bushing and fits into a longitudinally or axially disposed key-way 45 on the shaft 36 so as to permit the axial movement of the shaft relative to the pulley without interfering with the driving connection between these parts. A spacing sleeve 46 acts as a housing for the bushing 42 and is positioned between the pulley 43 and the adjacent side of the frame 10. The outer end of the bushing 42 is threaded as at 42' and receives the locking nuts 47 which firmly hold the pulley 43 and its associated parts in a fixed position relative to the grinder. The pulley 43 is driven by a belt operatively connected to a motor or the like not shown, and in turn actuates the shaft 36 and grinding wheel 38. It will be observed that when the shaft 36 is rotated by the pulley 43, it may, at the same time, be moved axially without interfering with the driving connection, so as to move the carriage 33 and grinding wheel 38 towards either of the sides 23 depending upon the direction of rotation of the handle 32.

The carriage 23 is provided adjacent the grinding wheel 38 with a pair of tubular bosses 48 through which loosely extend the spaced vertically disposed arms 49 and 50 of a follower member 51. One of these arms such as arm 49 is threaded as at 52 (Figure 6) and extends upwardly through a threaded bushing 53 connected to the carrier 33 by the bracket or plate 54. A coil spring 55 confined between a shoulder 56 of the bushing and the flange 57 on the bracket acts as a yieldable support for the bushing 53. An operating crank or handle 58 is connected to the bushing 53 by the set screw 59 to impart vertical movement to the follower upon the rotation of the bushing by the handle 58.

The cutter head is maintained in a fixed position relative to the grinder during the sharpening operation through the instrumentality of a pair of spaced threaded members 60, each of which extends vertically through a housing 60' (Figure 5) which is shown connected to the front end 61 of the frame 10 by the threaded bolts 62. Manifestly, the housing 60' may if desired, be formed integrally with the ends 61. A sleeve 63 is threaded on each of the members 60 so as to be moved axially when these members are rotated. The sleeves 63 are formed with laterally and inwardly projecting lugs 64 arranged to fit within complementary openings 65 in the hood 14 of the cutter head so that the grinder will act as a support for the cutter head during the sharpening operation (Figure 2). Each of the members 60 has an operating handle or wheel 66 at its upper end. Upon the initial rotation of the wheels 66, the lugs 64 will be moved to engage the openings 65, and upon further movement, the knives of the cutter head will be brought into proper position relative to the grinding wheel 38 to insure a uniform sharpening of the knives while maintaining the parts in a relatively fixed position.

The vertically disposed arms of the follower 51 are bent laterally at their lower ends to form the arms 67 (Figure 8) which are connected by the transverse arms 68 so as to constitute a one piece structure. Manifestly, the follower may assume various shapes and may be made of separate connecting elements so as to effect simultaneous movement of the arms 49 and 50 when the handle 58 is actuated. Extending inwardly from one of the laterally disposed arms 67 is a finger or supporting member 69 which when the follower is associated with a machine having spiral knives, has an inclined end or surface 70 which engages the side of the knife so as to conform with the contacting surface thereof. When the follower is used for sharpening straight edge knives, the end 70 is disposed substantially perpendicular or at right angles to the front and rear sides of the member 69 so as to coincide with the contacting surface of the knife being sharpened. The follower 51 is arranged to be removably connected to the frame so that the contacting edge 70 of the member 69 will conform in contour to the particular configuration of the knife being sharpened.

In operation, assuming that the grinder 10 is to be attached to the cutter head of a peeling machine such as shown in Figure 1, the support for the grinder is moved to a position so that the shafts 16 of the cutter heads will be positioned between the side frames 20. The grinder 10 is then moved axially along the bar 22 and when it reaches the proper position, is swung downwardly so as to be connected to the casing 14 of the cutter head 12 through engagement of the lugs 64 with the openings 65. The proper adjustment of the knives relative to the grinding wheel is then effected by the actuation of the handles 66 on the members 60. In the meantime, the carriage is moved to its extreme position on the right of Figure 1 by the actuation of the handle 32, so that the grinding wheel 38 will engage the adjacent edge of the knife 15. Upon the actuation of the shaft 36 through the drive pulley 43, the carriage 23 together with the grinding wheel 38 and follower 51 are simultaneously moved lengthwise of the cutter head by the manual actuation of the handle 32.

Before this operation takes place, the follower 51 has been adjusted so that the edge 70 of the finger 69 will engage the side of the edge 15 in the manner as shown in Figure 7.

As the cutter head 12 is freely revoluble, rotative movement will be imparted to it by reason of the engagement of the grinding wheel with the edge of the knife 15 so that as the sharpening operation proceeds, the spiral portions of the blade 15 will be progressively brought into contact with the grinding wheel. In other words, assuming that the grinding wheel 38 is revolved by the shaft 36 in a clockwise direction, the cutter head will be rotated in an opposite direction, thus insuring the progressive presentation of the edge of the knife 15 to the grinder.

To obtain an accurate grinding and balancing of the knives, it is essential that the edge of the knife be evenly presented to the grinding wheel, otherwise the efficiency of the grinder is seriously impaired. For this reason, the follower 51 is provided with the finger 69 which is arranged to be moved simultaneously with the grinding wheel during the sharpening operation, and which engages one side of the knife adjacent the point of contact of the grinding wheel with the edge of the knife, to insure the sharpening edge of the knife being properly located relative to the grinding wheel during the sharpening operation. In other words, the edge 70 of the member 69 is positioned to guide or support the knife as the edge portion thereof is progressively moved into contact with the grinding wheel, and thus constantly maintains the edge of the knife at the proper point of tangency with the edge of the grinding wheel to produce a uniform grinding and perfect jointing of the knife.

The cutter heads during the sharpening operation may have associated therewith means such as a depending weight 71 (Figure 2) which is eccentrically connected to each of the pulleys 18 of the cutter head shaft 17 to constantly impart a rotative movement to the cutter head in a direction opposite to that of the rotation of the grinding wheel to successively present the edge portion of the knife to the grinder.

When the knife of the cutter head 12 has been sharpened, the grinder frame is released therefrom and is swung upwardly about its pivotal connection with the shaft 22 and is moved longitudinally or axially along the shaft 24 until it aligns with the knife on the other cutter head 13. The frame 10 is then swung downwardly and connected to the hood or casing of the cutter head by the adjusting members 60, and the knife 15 is sharpened in substantially the same manner as previously described.

It will be seen that during the sharpening operation the carriage 33 together with the grinding wheel 38 and follower 51 are progressively advanced across the surface of the cutter head so that the edge of the grinder is continuously maintained in engagement with the edge of the knife 15 without interfering with the driving connection between the pulley 43 and the shaft 36. Additionally, the follower 51 which is moved bodily with the carrier 33 progressively engages the edge portion of the knife 15 so as to momentarily oppose the rotative movement of the cutter head to insure the presentation of the edge of the knife at the proper point of tangency with the grinding wheel.

While the grinder attachment is shown associated with a peeling machine it will be manifest that the same is equally efficient for use in sharpening various types of blades or knives without the necessity of removing the knives or cutter heads from the machines with which they are associated.

When the grinder is employed for sharpening straight edge knives, the follower 51 is withdrawn and a follower substituted therefor which has the finger 69 provided with an abutting edge disposed at substantially right angles to the front side of the finger so as to continuously engage the side of the straight blade. Thus it will be seen that the grinder may be efficiently used for sharpening either spiral or straight edge knives without requiring any substantial reorganization of its parts.

It is to be understood that the form of the invention herewith shown and described is merely illustrative of a preferred embodiment and that such changes may be made as fall within the purview of one skilled in the art without departing from the spirit of the invention and the scope of the appended claims.

We claim:

1. A grinder for sharpening planer knives or the like comprising a relatively fixed supporting frame, a carriage movably connected to the frame, a drive shaft associated with the carriage and movable axially therewith, a grinding wheel keyed to said shaft, means for rotating said shaft, means for simultaneously moving the carriage, drive shaft and grinding wheel axially relative to the frame, spaced vertically disposed housing members connected to the carriage and movable therewith, a substantially U-shaped follower member having spaced arms mounted in the housing, means connected to one of said arms for moving the follower vertically relative to the frame, said follower having a finger provided with an edge conforming with the shape of the side of a knife so as to engage the same and insure the edge of the knife being maintained at the proper point of tangency with the grinding wheel.

2. In combination with a planer machine having a cutter head and a cutter head casing, a grinder arranged to be positioned to sharpen the knives of the cutter head, said grinder including a support, a grinding frame movably connected to the support, a reciprocating carriage carried by the frame, a drive shaft associated with the carriage, means for rotating said shaft, means to effect axial movement of the shaft during the rotation of the latter, a grinding wheel keyed to said shaft, means for simultaneously moving the carriage, drive shaft and grinding wheel relative to the frame, and means connected to the frame and arranged to releasably engage the casing of the cutter head to properly position the knives relative to the grinding wheel during the sharpening operation.

3. In combination with a planer machine having a cutter head and a cutter head casing, a grinder arranged to be positioned to sharpen the knives of the cutter head, said grinder including a support, a grinding frame movably connected to the support, a reciprocating carriage carried by the frame, a drive shaft associated with the carriage, means for rotating said shaft, means associated with the frame to effect axial movement of the shaft during the rotation of the latter, a grinding wheel keyed to said shaft, means for simultaneously moving the carriage, drive shaft and grinding wheel relative to the frame, means connected to the frame and arranged to releasably engage the casing of the cutter head to properly position the knives relative to the grinding wheel during the sharpening operation, an adjustable follower connected to the carriage and having a portion arranged to engage the side of a knife adjacent the grinding wheel to maintain the edge of the knife in proper position during the sharpening operation.

4. In combination with a planer machine having a cutter head and a cutter head casing, a grinder arranged to be positioned to sharpen the knives of the cutter head, said grinder including a support, a grinding frame movably connected to the support, a reciprocating carriage carried by the frame, a drive shaft associated with the carriage, a grinding wheel keyed to said shaft, means for simultaneously moving the carriage, drive shaft and grinding wheel relative to the frame, a pair of spaced threaded members connected to the frame, a sleeve threaded to each of said members so as to be moved axially relatively thereto, each of said sleeves having an inwardly extending boss arranged to fit within a complementary opening in the cutter head casing so as to releasably connect the cutter head to the frame.

5. In combination with a planer machine having a cutter head and a cutter head casing, a grinder arranged to be positioned to sharpen the knives of the cutter head, said grinder including a support, a grinding frame movably connected to the support, a reciprocating carriage carried by the frame, a drive shaft associated with the carriage, a grinding wheel keyed to said shaft, means for simultaneously moving the carriage, drive shaft and grinding wheel relative to the frame, a pair of spaced threaded members connected to the frame, a sleeve threaded to each of said members so as to be moved axially relatively thereto, each of said sleeves having an inwardly extending boss arranged to fit within a complementary opening in the cutter head casing so as to releasably connect the cutter head to the frame, and an adjustable follower connected to the carriage, said follower having a portion conforming with the shape of the side of a knife so as to engage the same adjacent the grinding wheel to maintain the knife in proper position during the sharpening operation.

6. A grinding machine for sharpening cutter head knives without removal of the knives from the head, comprising a supporting frame, a carriage movable lengthwise of the frame, a drive shaft extending through one end of the frame and said carriage, a grinding wheel keyed to said shaft adjacent the carriage, a pair of revoluble threaded rods mounted in the opposed ends of the frame and operatively connected to said carriage to move the carriage and grinding wheel lengthwise of the frame, means for simultaneously rotating said rods, means for actuating said drive shaft to rotate the grinding wheel, a pair of spaced adjustable members extending from the frame and provided with means for releasably connecting the cutter head to the frame whereby to maintain the parts in a fixed position, and means connected to said carriage and arranged to engage the knives to insure the proper location of the latter relative to the grinding wheel.

7. A grinding machine for sharpening cutter head knives without removal of the knives from the head, comprising a supporting frame, a carriage movable lengthwise of the frame, a drive shaft extending through one end of the frame and said carriage, a grinding wheel keyed to said shaft adjacent the carriage, a pair of revolubly threaded rods mounted in the opposed ends of the frame and operatively connected to said carriage to move the carriage and grinding wheel lengthwise of the frame, means for rotating said members, means for actuating said drive shaft to rotate the grinding wheel, a pair of spaced adjustable members extending vertically from the front end of the frame and provided with means for releasably connecting the cutter head to the frame whereby to maintain firmly the parts in a fixed position and permit accurate adjustment of the grinding wheel relative to the knives during the sharpening operation, and adjustable means connected to said carriage and arranged to engage the knives to insure the proper location of the latter relative to the grinding wheel.

8. A grinding machine for sharpening cutter head knives without removal of the knives from the head, comprising a supporting frame, a carriage movable lengthwise of the frame, a drive shaft extending through one end of the frame and said carriage, a grinding wheel keyed to said shaft adjacent the carriage, a pair of revolubly threaded rods mounted in the opposed ends of the frame and operatively connected to said carriage to move the carriage and grinding wheel lengthwise of the frame, means for simultaneously rotating said rods, means for actuating said drive shaft to rotate the grinding wheel, a pair of spaced hollow members connected to the front side of the frame, a vertically disposed threaded rod extending axially through each of said hollow members, and adjustable bosses carried by the vertical rods and arranged to be detachably connected to the cutter head whereby to maintain a knife in proper adjusted position relative to the grinding wheel during the sharpening operation.

9. A grinding machine for sharpening and jointing cutter head knives without removal of the knives from the head, comprising a supporting frame, a carriage movable lengthwise of the frame, a drive shaft extending through one end of the frame and said carriage, a grinding wheel keyed to said shaft adjacent the carriage, a pair of revoluble threaded rods mounted in the opposed ends of the frame and operatively connected to said shaft to move the carriage and grinding wheel lengthwise of the frame, means for simultaneously rotating said members, means for actuating said drive shaft to rotate the grinding wheel, a pair of spaced hollow members connected to the front side of the frame, vertically disposed threaded rods extending through said hollow members, adjustable bosses carried by the vertical rods and arranged to be detachably connected to the cutter head whereby to maintain a knife in proper adjusted position relative to the grinding wheel during the sharpening operation, and a follower member adjustably connected to the carriage and arranged to engage the knives to insure the proper location of the latter relative to the grinding wheel.

10. A grinding machine for sharpening and jointing cutter head knives without removal of the knives from the head, comprising a supporting frame, a carriage movable lengthwise of the frame, a drive shaft extending through one end of the frame and said carriage, a grinding wheel keyed to said shaft adjacent the carriage, a pair of revolubly threaded rods mounted in the opposed ends of the frame, means operatively connecting the rods to each other, an operating handle connected to one of the rods for effecting longitudinal movement of the carriage and grinding wheel relative to the frame, means operatively connected to the drive shaft for rotating the grinder wheel, a pair of spaced hollow members connected to the front side of the frame, a vertically disposed threaded rod extending axially through each of said hollow members, said vertical rods having bosses thereon arranged to detachably engage the cutter head to maintain the latter in a fixed position relative to the frame during the sharpening operation, and an adjustable follower connected to the carriage and having a portion arranged to engage a knife of the cutter head to insure the proper location of the latter relative to the grinding wheel.

WALLACE E. JONES.
JAMES D. TAYLOR.